May 28, 1946.  J. F. DREYER  2,400,877
OPTICAL DEVICE AND METHOD AND MANUFACTURE THEREOF
Filed March 21, 1941
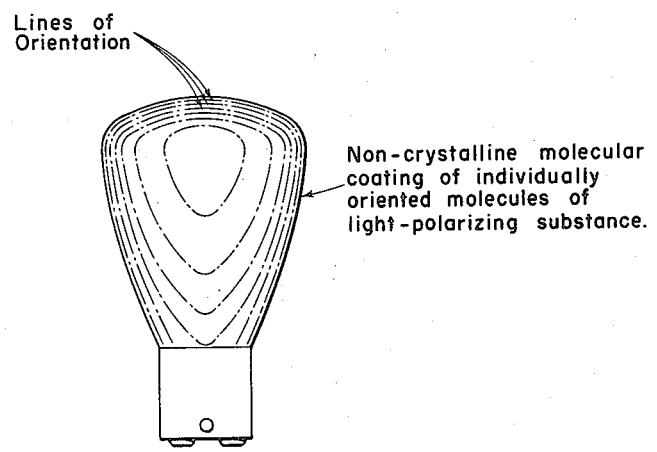
Lines of Orientation
Non-crystalline molecular coating of individually oriented molecules of light-polarizing substance.
INVENTOR.
John F. Dreyer
BY
ATTORNEYS Patented May 28, 1946

2,400,877

UNITED STATES PATENT OFFICE 2,400,877

OPTICAL DEVICE AND METHOD AND MANUFACTURE THEREOF

John F. Dreyer, Cincinnati, Ohio

Application March 21, 1941, Serial No. 384,550

10 Claims. (Cl. 88—65)

This invention relates to a method of molecular orientation and to products and devices having oriented molecular arrangement, and to the manufacture thereof.

More particularly my invention relates to the production of oriented light polarizing films, by depositing and orienting a film of polarizable material upon a suitable surface. By "polarizable material," I mean one which, when suitably oriented, is capable of polarizing light or is adapted to be readily converted into a material which polarizes light.

Another object of my invention is to provide a method for producing polarizing material, which will be simple, inexpensive and satisfactory for practical uses.

Another object of my invention is to produce a new type of polarizer which will be superior for many purposes and particularly a polarizer which will enable one to view polarizing portions of another object in light rather than in shadow or silhouette.

Another object of my invention is to provide polarizing films on curved and intricate surfaces and to provide films in any of unlimited colors and color combinations.

Other objects and numerous advantages will appear more fully in the accompanying description and drawing.

My present invention is based upon the discovery that certain types of molecules which occur in known polarizable materials can be oriented by being juxtaposed to other oriented molecules or otherwise subjected to an orienting field.

According to my present invention, I apply polarizable materials in solution or in a fused condition into juxtaposition to an oriented surface, or otherwise into an orienting field, and then, by bringing the polarizable material into the nematic state, I produce a non-crystalline polarizing material oriented in conformity to the orientation of said surface or other orienting field; and thereafter I fix the orientation in such material by controlled solidification.

Many materials are kown which are both polarizable and form nematic liquid crystal by evaporation of solutions or by temperature change. Numerous dyes, deposited by evaporation of solutions in water or organic solvents, are examples of such materials and, when treated according to my invention, form on an oriented surface a correspondingly oriented film.

This phenomenon of polarizing light by solid substances had always, before my invention, been associated with crystalline materials and it had not been conceived possible to obtain a non-crystalline polarizer.

My present invention departs from these existing sources of polarizing material, which have necessarily depended upon the forces of crystallization to determine the final orientation of the molecules, in that I utilize a non-crystalline film. In my invention I utilize polarizable materials which are capable of existing in the nematic state—i. e., which when being solidified under appropriate conditions go through a phase, intermediate between ordinary liquid and solid phases, in which the molecules, while still fluent, are more restricted in the nature of their movements than in ordinary liquids—by my invention I solidify such materials from the nematic state to a non-crystalline film or body.

The molecules of the polarizable material, in the nematic state, tend to fall spontaneously into parallelism with respect to one axis while still retaining mobility in other respects. According to my invention the film is subjected, during this spontaneous orientation, to a field which influences molecules in the film so as to determine the direction of such spontaneous orientation; and I have found that, because of this inherently assured parallelism of the molecules, only a very weak field is required to establish complete and uniform orientation throughout the film when it enters the nematic state; but I have found that special precautions must be taken if this orientation is to be preserved intact in a solid film, since normally the change from the nematic state to the solid state is attended by disappearance of the parallelism which destroys the uniformity of polarization. This disorientation may be due to a reorientation of the molecules on crystal lattices, or to physical disturbance caused by too violent removal of the solvent, or to other causes not fully understood. At any rate, I have found that, if the orientation is to be maintained, the solvent should be removed by diffusion and evaporation; not by ebullition; and conditions during solidification must be controlled to avoid crystallization.

The phenomenon of spontaneous orientation in the nematic state had been studied scientifically before my invention; and it had been observed that the direction of such orientation could be readily influenced by electric and magnetic fields as well as by orienting field effects on solid surfaces. It had also been observed that certain dyes when applied to solid surfaces would display an optical orientation corresponding to orientation of the surface on which the dye film is applied, but this phenomenon had not been available as a practical method for producing light polarizers because of the uncertainty and lack of uniformity of orientation in the final solidified film (cf., Chem. and Industry, vol. 56 (1937), pg. 698). It had also been attempted to make use of the spontaneous orientation occurring in the nematic state for production of polarizing films, but here also it was found that on solidification the orientation along lines determined by the supporting surface was destroyed and replaced by an orientation into crystal patterns.

These difficulties I have now found can be overcome by properly controlling the rate of solidification from the nematic state, taking into consideration the nature of the material being solidified. Accordingly, by my invention, I apply a polarizable material to a suitable surface and then bring it uniformly into the nematic state while subjecting it to a field determining its direction of orientation; and finally I solidify the film at a rate carefully controlled to fix the orientation of the nematic state before any substantial disorienting by rearrangement into crystal lattices, or otherwise, can occur. The resulting film is substantially free from true crystalline formation, as is evidenced by the fact that X-ray examination shows no diffraction pattern; and in other respects the material of the resulting film is more akin to resins than to crystalline materials—I, therefore, refer to these materials as "resinoid" but the material differs from ordinary amorphous resins in that it retains substantially the orientation produced, as described, in the nematic state.

The chemistry of compounds which may be brought to the nematic state has been studied and fully discussed in the literature; see, inter alia, Vorlander "Chemische Kristallographie die Flüssigkeiten," Leipsiz (1924). They are generally long chain polar molecules without heavy side chains. Among materials which have such structure are included particularly many of the "para" substituted aromatic class. The molecule should not be too long as it may then be cumbersome so as to delay excessively its orientation or to be kept from full orientation by entanglement with other molecules. If, on the other hand, the molecule is too short, it may be so readily orientable as to crystallize, i. e., re-orient into crystal lattices, even with rapid drying which would be adequate with longer molecules which are slower to re-orient and which are more nearly resinous in their properties when solidified. As indicated, the effect of polar groups is also important.

It is also known that mixtures may show the nematic state, although the materials of which the mixture is composed do not do so when pure. Such mixtures may be used for purposes of my invention. The addition of impurities may thus be desirable to improve the range of the nematic state. Thus, for example, sodium alizarine sulfate, among others, is known to extend the nematic state. I have likewise added laurylamine to naphthol yellow S and glycerine to Basic Brown BR with improved results. Other impurities or additions are ineffective or harmful, depending upon the dichroic material being used.

Especially desirable within this class of nematic materials are numerous pleochroic dyes and dye intermediates among which I have found most satisfactory:

| Color index No. | Name | Source |
|---|---|---|
| 10 | Naphthol Yellow S | Geigy Company. |
| 26 | Croceine Orange | |
| 150 | Orange I | National Aniline. |
| 169 | Chrome Fast Violet B | |
| 184 | Amaranth W | Geigy Co. |
| 201 | Chrome Blue Black B | |
| 246 | Naphthol Blue Black B | Geigy Co. |
| 252 | Croceine Scarlet M B | Do. |
| 289 | Fast Wool Cyanone R | National Aniline. |
| 294 | Buffalo Black 10 B | |
| 299 | Buffalo Chrom Black F | National Aniline. |
| 302 | Fast Green B | Geigy Co. |
| 304 | Nerol 4 B | Do. |
| 332 | Basic Brown B R | Du Pont de Nemours & Co. |
| 364 | Brilliant Paper Yellow conc. | Du Pont. |
| 370 | Congo Red | Coleman & Bell Co. |
| 382 | Triazol Fast Red B | Ciba Co. |
| 415 | Benzo Orange R conc. | Geigy Co. |
| 640 | Tartrazine | Coleman & Bell Co. |
| 657 | Victoria Green S C | Du Pont. |
| 658 | Setoglaucine | |
| 715 | Xylene Cyanol F F | Eastman Kodak. |
| 808 | Pinacyanole | Do. |
| 825 | Neutral Red | Coleman & Bell. |
| 842 | Fuchsia | Do. |
| 911 | New Methylene Blue | |
| 920 | Lauth's Violet | Coleman & Bell. |
| 922 | Methylene Blue | Do. |
| 924 | Calcozine Green V | Calco Chemical Co. |
| 925 | Toluidin Blue | Coleman & Bell. |
| 927 | Calcozine New Blue N | Calco Chemical Co. |
| 1034 | Alizarine Red S | Coleman & Bell. |
| | Naphthol Navy Blue M | Geigy Co. |
| | Alizarol Black 3G | National Aniline. |
| | Erio Chrome Black DF | Geigy Co. |
| | Zapon Fast Blue HL | General Dyestuffs. |
| | Zapon Fast Green HL | Do. |
| | Kraft Brown S | Badische. |
| | Resin Violet B | National Aniline. |
| | Condensation Orange FI | Calco Chem. |
| | Para-azoxyanisol | |
| | Para-azoxyphenetol | |
| | Anisole alpha benzol-azo alpha naphthylamine. | |
| | Acetic ester of phylosterin valerate. | |
| | 10 brom-phenanthrene 3 or 6 sulfonic acid. | |
| | 10 chlor-phenanthrene 3 or 6 sulfonic acid. | |
| | Arsphenamine | |

It will be observed that the above list is representative of a large class of compounds which combine the polar molecular structure described above with the property of pleochroism or the ability to be readily converted into a pleochroic material while in a solid oriented film. This class has not heretofore been used or recognized as practically suitable for light polarizers because of the difficulty of producing satisfactorily oriented films or other bodies; but my present invention makes these materials available by its utilization and direction of the spontaneous orientation occurring in the nematic state and the fixing of that orientation by a rapid controlled solidification.

These materials, which I have described as "nematic materials," may be brought into the nematic state, e. g., either by cooling to the temperature range within which they exist in this state, or, in the case of solutions, by evaporating solvent therefrom. The passing into the nematic state is ordinarily indicated by a decrease in viscosity and may be observed directly by inspection in transmitted polarized light. When the nematic state is reached, in the case of polarizing materials, the nematic liquid will absorb strongly when its polarizing plane is crossed with respect to that of the polarized light; and in the case of non-polarizing materials the nematic liquid will act as a wave-plate or fractional wave-plate (depending upon its thickness) with the same characteristic effect on polarized light as other wave- or fractional wave-plates.

As the substance is brought into this nematic state its molecules should be subjected to the exterior orienting influence so that when they come into parallelism they will be directed in the desired direction. The orienting forces between the molecules then work in conjunction with the exterior orienting influence.

To produce the permanently oriented film, the molecules are set chemically or physically from the nematic state. This may be done, for example, by lowering the temperature, or by evaporating the solvent, or, in some cases by a chemical reaction which converts the liquid to a solid without disturbing the orientation of the molecules.

Initiating the orientation and solidification at the oriented surface, or simultaneously throughout the film, may be achieved, in the case of fused substances, by chilling said surface, and in the case of solutions by choice of a solvent which tends to concentrate at the exposed surface of the film, and by control of the rate of drying to approximate the rate of diffusion of the solvent or heat in the film to the surface of the film. In the case of chemical reaction, this may be achieved through temperature control, especially temperature control of the supporting surface, or by a promoter or reagent on the surface.

Advantageously the material remains for a substantial period in the nematic state, so as to assure thorough orientation and that the material shall be uniformly at the point of solidification; and then is solidified, by removal of heat or solvent or by chemical treatment, as rapidly as is consistent with the production of a uniform film or other body and with avoidance of objectionable secondary effects. The lower limit of the rate of solidification in this stage is that at which crystal formation begins to appear, and this in turn depends upon the nature of the particular material being solidified. The larger molecules which re-orient more sluggishly and especially those which tend normally to form resinoid solids may be solidified in my invention at a slower rate than those which normally tend to form crystalline solids; but in any case the molecules must not have time to drift away from their oriented relation during solidification.

A resinous setting or congealing of the film is facilitated by keeping the temperature low at this stage. Thus the temperature during and immediately prior to solidification should be below 50° C. in all cases and advantageously below 40° C.; with many materials it should be below 20° C., and with some as low as 5° C. Many materials which are not available for use at the higher temperatures become wholly satisfactory when lower temperatures are used; Zapon Fast Green HL is such a material; the temperature in its case being kept between about 10° C. and —10° C. for best results.

The selection of solvents or other ingredients in the material which is to be solidified may also have a part in the nature of the solidification. Materials which remain dissolved in the film during and after solidification, e. g., mutual solvents which may be dissolved in the solid as well as being a solvent for the solid, and other foreign materials which remain in the film during solidification and tend to inhibit crystallization may serve to bring about the desired resinous condition or congealing.

During evaporation to and through the nematic range, the upper limiting factors on the speed are (1) the rate of diffusion of the solvent or heat to the surface to avoid solidification or orientation at the exposed surface of the film before the lower parts of the film are oriented, (2) physical disturbance of the molecules by the solvent passing thru the film and (3) the chilling of the film by evaporation which may in particular cause deposition of moisture from the air if the temperature of the film drops below the dew point. Where a dry atmosphere is maintain over the film, advantage may be taken of rapid evaporation for assuring the low temperatures as mentioned above.

Beyond the considerations already mentioned, a solvent, if used, should be one which in the solution will readily wet without dissolving the surface on which the polarizing material is to be formed, it should not adversely affect the orienting field—particularly it should not corrode the rubbed or otherwise oriented surface nor itself form crystals nor crystallize any other ingredient of the solution under conditions of drying and should not be hygroscopic if used in an atmosphere containing moisture; it should dissolve the polarizable material in sufficient degree to disperse the molecules to produce substantial films or other bodies, and it should be sufficiently volatile to be rapidly evaporated at reasonable temperatures which will not adversely affect the various materials used. Solvents which I have used satisfactorily include methanol, water, acetone, ethyl alcohol, ethylene glycol, glycerine, acetin and mixtures of these. The choice will, of course, depend upon the particular material, bearing in mind the consideration stated herein. In general, best results have been obtained with methanol, which readily dissolves most dyes, wets most surfaces and tends to concentrate at the exposed surface of the dye solution, is highly volatile, and non-hygroscopic.

Solvents which in themselves do not satisfactorily wet the surface to be used may be made to do so by suitable additions. Thus, I have found advantage in using common wetting agents, e. g., sodium lorol sulfate in aqueous solutions. ("Lorol" indicates a commercial mixture of higher aliphatic groups with lauryl predominating.)

The evaporation of the solvent or the solidification of the fused material ordinarily fixes the direction of the particles so that thereafter, even though the film may be removed from the field or subjected to a different field, the established orientation will continue. It is not necessary that there should be any separate setting or fixing medium, such as a binder or coating; such may be used, as already stated above, but in the preferred embodiment of my invention the molecules themselves have an adhesion for the surface on which they are deposited so that, if the surface is protected against physical abuse, e. g., by covering with another protective film or plate, the film will remain in place and the particles in the required orientation.

The percentage of solvents used with the dye will depend primarily upon the viscosity of the resulting solution and the thickness of the film desired. If the film is too thick, a crystal growth in the film may result, which may impair the desired uniform polarization, or the film may have too low transparency; if it is too viscous the effects of brushing, flowing, etc., in the viscous material, may over-balance the desired effect of the orienting field and the molecules may be slow to respond to that field. The thickness of the film may be reduced at will until the polarizing effect becomes insufficient. The particular depth desired between these limits may be attained by control of viscosity or by other methods, for example, the speed of removing from a bath into drying or cooling atmosphere or the angle of the surface, where the material is flowed on or drained off before solidification, or by other means which will be apparent to those skilled in the art.

The solution thus used may contain other materials than the solvents and the polarizing material if the concentration of these materials is not so high as to impair the polarizing effect. Ordinarily, however, I prefer not to add foreign matter, except where it is desired to include a lacquer material, such as a resin, cellulosic derivatives or a drying oil, which will serve as a binder or body to fix the polarizing material on the surface after the solvent has evaporated or to carry the polarizing material if it is to be removed from said surface or to make the film more resistant. Mixtures of polarizable materials may be used or a polarizing dye may be mixed with a dye or other color which is not polarizable. Ingredients may be included which improve adhesion of the film or improve its strength or resistance to weathering, corrosion or abrasion, or by responding more strongly to orienting influences tend to facilitate orientation of the polarizable material, etc. Such additions or impurities in general, however, should be such as are consistent with transparency in the film, since opaque particles may, by diffuse reflection within the film destroy to some extent the uniformity of polarization, and caution should be used in their selection since added materials, depending upon the nematic substance being used, may interfere with the desired result.

The film of the polarizing material may be applied, whether in solution or as a fused liquid, by any of the usual means and methods, e. g., by spraying, flowing, pouring or brushing onto the surface. Or it may be applied as comminuted solid or a film which is fused on said surface after application. An excess of the material may be applied and the excess allowed to drain off by gravity or be driven off by centrifugal force or taken up by brushing, etc. It should be borne in mind, however, that flow, particularly while the material is in the nematic state may exert an orienting influence, and where possible it should be arranged so that this influence coincides with the desired orientation. So long as the liquid is in the amorphous, isotropic condition, however, any orienting influence of flow is slight and does not seriously disturb an orienting field such as that which may be produced by rubbing the surface.

The film may also be applied by dipping the surface into a body of liquid and slowly removing so that the running back of the excess is essentially constant. Although it is desirable that the thickness should be uniform, the thickness which is required is not critical. For example, with a given solution and using the dipping method, speeds of removal of from one to ten inches per minute may be used in different cases, and in each case a satisfactory product will be obtained although, of course, the product formed with the faster speed will have the thicker film. The films thus produced, although fluid, adhere to the glass and essentially remain in place. It is not necessary that the film be only one molecule in thickness, and in general increasing thickness will merely increase the extent of light absorption or extinction. Where thicker films are desired than can properly be made in one application, successive films may be applied one over another, preferably with an intermediate treatment to protect the film against redissolving if the film is one which otherwise would be redissolved under conditions of the second treatment.

The necessary uniformity of drying may be accomplished in various ways already known in the art of drying films. One method which I have found particularly satisfactory is to keep the film wet until all parts are coated, then uniformly to change the condition of the atmosphere about the coated part, e. g., by coating in an atmosphere saturated with vapor of the solvent used and then moving uniformly into a dry atmosphere or through progressively drier atmospheres after the entire film has been deposited.

When the film is flowed uniformly onto the surface, as for example in the case of dipping and lifting at a uniform speed from a body of liquid, the drying may occur by flowing a constant stream of dry gases over the surface. It is not necessary that the film should dry in all areas at the same time, but if the drying is not uniform as between different areas it should be uniformly progressive, and advantageously it should be progressive from one edge to the other across the entire area. All areas should be subjected to the same drying sequence and the sequence if not simultaneous should progress like a wave sweeping across the film.

I have found that best results are obtained when the drying occurs in a uniform and advantageously countercurrent flow of gases, so that the vapors given off by the drying film are removed as quickly as possible from the atmosphere around the surface which is drying.

Drying may be more rapid after the point of solidification is reached than while passing into and through the nematic range. Various rates of drying may be chosen, but if it becomes too slow there will be a change in the degree of transparency and dichroism. If the final drying rate is very slow, crystal forms may occur which are not oriented with respect to the base. Faster drying produces a resinoid, non-crystalline film which is smooth appearing in reflected light and is uniformly clear in transmitted light. This is the proper rate. If the final drying rate is a bit faster the orientation may be imperfect and the film not clear, the surface reflection being like that from a slightly rough surface. This condition may be a mixture of the two bordering conditions.

If the drying rate is too fast, the dye or other polarizable material tends to precipitate in the outer surface of the film where it may not sufficiently subjected to the orienting fields or, especially if ebullition occurs the passage of the solvent to the surface may disturb the oriented molecules; the film may then appear cloudy and rough and orientation may be irregular and not fully developed. The film should dry evenly from the inside out without ebullition and without premature precipitation in other parts. By chemical or thermal treatment of the type hereinafter described for developing dichroism, depending upon the dye or other pleochroic material used, it is sometimes possible to convert an unsatisfactory film into a satisfactory resinoid film after it has dried.

In determining the proper rate for any given material the film may be observed during drying with polarized light related to the desired orientation of the material so as to produce maximum extinction or wave-plate effects when the desired orientation is attained. If the drying rate should be too fast or too slow for the particular material the resulting irregularity of orientation becomes immediately visible in the irregularity of the observed polarized light.

In general, drying at the proper rate produces a film which is clear and transmits light with a minimum of distortion. For some dyes, however, such as Lauth's violet and methylene blue, the film is essentially colorless when dried quickly in a dry atmosphere and does not polarize light passing perpendicularly through it. The film in such case may be dried quickly and then converted to a polarizing film, e. g., by a slight chemical treatment. Such conversion can be produced by oxidation, e. g., by potassium bichromate mixed with a strong mineral acid, e. g., hydrochloric or sulfuric, by hydrogen peroxide, or by chromic acid, etc., or by mild reduction, or formation of a double salt, e. g., with zinc chloride, mercurous chloride, stannous chloride, sodium nitrite, etc., or adsorption by sodium bichromate, potassium bichromate, etc., or by combination with acids or bases, e. g., with tannic acid, succinic acid, sodium hydroxide, calcium hydroxide, ammonia, etc., or by addition or subtraction of groups, e. g., nitration, chlorination, etc., or by change of pH.

I have also found that coordinate bonds in the molecules have a significant action producing or increasing dichroism and also the heat and light resistance of the polarizing film. Thus, for example, the oriented film can be improved by bathing in a solution of a metal salt, for example, a solution of zinc chloride or zinc ammonium chloride, or cadmium iodide in which the dye becomes mordanted.

If the dye film is warmed up to about 100° C. to drive off water of hydration before treating, e. g., with a solution of zinc chloride, the dichroism resulting will be enhanced. Experience has shown that the best concentration of zinc chloride to use is in the neighborhood of twenty-five parts by weight of zinc chloride and seventy-five parts water. Increase of the water content reduces the amount of dichroism produced while increase of the salt content tends to increase the solution of the dye.

These or other chemical changes may also alter specific properties of the oriented material without destroying its ability to polarize light. Thus, with many of these dyes the treatment with sodium bichromate plus an acid will not only improve the pleochroism but will also increase the water resistance. Likewise, a nitration treatment improves the resistance to light, thus increasing the useful life of the material. The use of cadmium iodide as the mordanting chemical prevents the reformation of the liquid crystalline nematic state.

The presence of certain substances either in the dye solution or in the drying atmosphere may affect the pleochroism of the resulting film. Thus, the presence of water, probably by combining as water of hydration by coordinate bonds may cause a dye to change from a non-polarizing to a polarizing form or vice-versa, depending upon the dye in question. If moisture is present either in the solvent or in sufficient quantity in the drying air, a methylene blue film will have a green metallic reflection and will have a reddish-purple dichroism. If the drying atmosphere is water free and there is no water present in the solvent, the film will not have metallic reflection and will not be dichroic. Such a film can be made dichroic blue by subsequent treatment, as above set forth. Likewise the green reflecting reddish-purple transmitting type can also be converted into the dichroic blue type by such chemical treatment.

The field effect by which the orientation is secured will ordinarily be a result of an orientation of the surface on which polarizable material is deposited, but it may be created or enhanced by external means, e. g., a static electrical or magnetic field. Field magnitudes of the order of 200–10,000 gausses or more and 200–15,000 v/cm. or more may be used for orienting dipole materials (Faraday and Kerr effects), but this is unnecessarily complicated. I have found that the best results are obtained, and with extreme simplicity in manufacturing technique, by merely rubbing the surface on which the film is to be deposited before the deposition occurs, or in the case of flexible base, such as cellulosic film, by stretching. The resulting field effect may be due to Van der Walls forces, or it may be due to the physical contour of the molecules at the surface, which in turn exert an orienting field upon the molecules in the applied film. Whatever may be the explanation, I have found that strong brushing, rubbing, or stretching of the supporting surface in one direction, or any other treatment which effects surface anisotropy of the support, will result in a definite orientation of the polarizable materials applied to the treated surface; and I have referred to such a surface as "oriented."

The choice of material used for rubbing is not critical. Leather, silk, cotton, paper, rubber, metal, etc., may be used for this rubbing treatment. This material as well as the surface rubbed, should advantageously be dry and chemically inert, as ordinarily considered, with respect to one another. The surface to which the film is to be applied will ordinarily be thoroughly cleaned in order to get good adhesion of the polarizing film and to obtain the uniform drying and uniformity of the dried film. This should be adopted, for example, in the case of Methylene Blue on glass, but such cleaning is not ordinarily necessary, and some materials which have a lesser affinity for glass may give better results if the glass is covered with a thin film of some other material, such as glycerine. Foreign films may be applied to improve adhesion of the film, to give a better orienting surface than the base alone or to facilitate stripping films from the support.

The cleaning, if desired, can be done by scrubbing, advantageously with mild abrasives, e. g., rouge, chemical cleaning agents, e. g., a strong soap solution or other detergent, a strong acid, e. g., nitric acid, an alkali, e. g., tri-sodium phosphate, or an oxidizing agent, e. g., potassium bichromate plus sulfuric acid. Technically this cleaning should take place before the rubbing treatment inasmuch as the rubbing during cleaning or drying, or even the chemicals used for cleaning, might affect the orientation.

The base material which is subjected to this treatment may be any of a wide variety of materials, especially an amorphous material such as glass, cellulosic film or resin. Crystalline materials, e. g., such as mica, may be used without rubbing if the orientation is sufficiently strong and uniform, but may be treated by rubbing in a direction to give an orientation coincident with the natural surface orientation of the crystal. The base should not be dissolved by any solvent used in forming the film and it should not have any strong orientation or field effect opposed to that which is desired in the surface film. Since the dried film is intended for optical purposes, the base should ordinarily be one which transmits light or should have a reflecting surface.

I have also found that certain materials will work best on certain bases. Thus, dyes which are best for glass may be inferior on Cellophane to other dyes (even though the latter are quite inferior on glass) or vice versa.

It had been known prior to my invention to produce orientation of applied crystals of polarizing material by flowing, field effects and surface orientation as well as by mechanical treatment, e. g., stretching the base after the material is applied or smearing onto a base; e. g., but, so far as I am aware, it had not been known prior to my invention that a molecularly oriented noncrystalline polarizing film could be formed, without itself being stretched, by application to a material which had been previously stretched or otherwise treated to produce an oriented surface.

After the application, orientation and drying of a film, according to this invention, it may be subjected to various additional treatments to modify or improve its properties in addition to or other than the chemical treatments already described for developing dichroism.

Thus, for example, the film may be subjected to "topping" in a similar manner as in ordinary dye technique, especially to "topping" with a second dye applied onto the first. If the second dye is a polarizable dye, the dichroism or polarizing effect can in this way be substantially enhanced; and colors can be modified, e. g., balanced to produce a neutral grey absorption. Also, since the last color applied may control the appearance by reflected light, this may alter the apparent color of the film. Dyes may be used in this way which combine chemically or by molecular association (through coordinate bonds). Thus, for example, a Zapon Fast Blue HL film applied to a rubbed glass surface and dried can be "topped" by dipping into a water solution of Methylene Green, Neutral Red or Resin Violet B; or a Naphthol Yellow S oriented film may be dipped in a twenty percent solution of Toluidine Blue in Water. Methylene Blue may be topped with Naphthol Yellow. The excess dye which has not combined may be washed off and it will be found that the dichroism is increased by the second or "topping" dye, and the desired color modification obtained. This effect is improved (as is the case with other chemical treatments referred to above) by driving off water of hydration from the first film (e. g., by heating in an oven at 100° C.) before applying the second dye. Or, for example, a second film of Methylene Blue which has been made water-resistant by washing with potassium bichromate and acid.

Another method is to apply one film over the other with a separating layer between. This separating layer may or may not be the orienting influence of either film. For example, on an oriented film of Methylene Blue a film of polystyrene resin is deposited from solution. This resin film is rubbed for orientation and a second compound, e. g., Brilliant croceine, is deposited. Or a Methylene Blue film can be produced, suitably oriented and dried and then protected with a film of stearate which is also oriented by brushing, then on this is evaporated a Neutral Red film. Another method is to place two separate oriented films face together with an intervening layer of resin for adhesion purposes; or films may be applied to opposite surfaces of the supporting base.

Dyes may be mixed in the same film as well as applied in overlying films. Thus Zapon Fast Blue HL can be mixed with Neutral Red to give a stronger absorption of light than either gives alone.

In these ways it is possible to produce films with absorption in almost any part of the spectrum and in many cases these dyes produce polarization selectively in certain spectral ranges while leaving light of other wave-lengths substantially unpolarized.

It is also feasible to increase polarizing efficiency by "topping" with materials which are not dyes. The various chemical treatments set forth above for developing dichroism in Methylene Blue may be used also for this purpose. In addition to improving the polarizing effect, such treatment may also modify the color. Thus cadmium iodide used for "topping" Methylene Blue converts it into a reddish film of good water resistance. In general any treatment which tends to resinify the film without disturbing orientation is useful at this stage as well as during solidification. Aldehydes may be used in this way with many dyes.

Summarizing, a specific color may be obtained: (1) By use of an orientable substance of the specific color. (2) By altering an oriented film chemically to the specific color, for example, by combining with metal salt, as in the case of treatment of methylene blue with zinc chloride. (3) By mixing dyes. (4) A dye of one color may be applied and oriented and over it a dye of another color may be applied and oriented.

Where a colorless film is desired the colors chosen should be such as to complement the spectrum of one another so that in effect the color of the combined dye is black, resulting thus in a greyed effect to direct transmission of light and a substantial extinction of light where oriented films are crossed.

Although for the most part these films will be produced on glass, it is an advantage of my invention that I may produce flexible films. Thus, for example, I may coat a sheet of glass with a foreign film, for example, paraffin, wax oil, mineral oil, barium stearate or a resin. This film may then be oriented by rubbing or brushing and the dye applied to it. If the foreign film is one which can be self-sustaining it can then be stripped from the glass carrying the oriented dichroic material; or the flexible supporting film may be made in other ways and oriented and coated according to my invention while it is stretched or otherwise supported. Instead of applying the polarizing film onto the flexible support, such a supporting film of resin or other flexible material may be applied onto the polarizable coating after the latter has set or dried on glass or any other temporary support; and the two may then be stripped from the glass as a single film. Thus, for example, a desired polarizing film may be formed on a sheet of mica and when suitably oriented and dried it may in turn be coated with methyl methacrylate resin. The resin film is then stripped off from the mica carrying with it the polarizing film. This stripping may be facilitated by the coating of foreign material, and to this end the film may be heated during the stripping. Or, to facilitate stripping, it may be desirable to soak the film in a water solution of potassium iodide or other bath which tends to break the film between the polarizer and supporting base.

If only one side of the film is covered with resin before stripping a protective coating may be applied to it after it is stripped or the entire film may then be applied to it after it is stripped or the entire film may then be applied to a flexible back, for example, Cellophane or cellulose acetate, which may add strength to the flexible film and may also serve as a "wave plate," if it is oriented, as is the case with Cellophane (which is a stretched cellulosic film).

The polarizing film may also be supported and protected by sandwiching between two supports, e. g., of glass.

The accompanying drawing shows a view in side elevation of a lamp bulb embodying my invention with the orientation indicated diagrammatically by broken lines.

The following is an example of the practical utilization of my invention as applied for example to a standard headlight bulb for automobile headlamps. The surface of the glass is first cleaned, for example, by dipping it in a concentrated solution of 100 parts by weight of potassium bichromate and 70 parts concentrated sulfuric acid (66 degrees Baumé). After ten minutes the bulb is removed from the solution and adhering chemical is washed off. The surface is then wiped dry with clean absorbent paper or cloth, rubbing in one direction for the desired orientation. Or the surface may be dried by evaporation if a subsequent rubbing treatment is carried out for orientation, for example, on a clean buffing wheel, e. g., of cotton or wool cloth or felt or of paper. The direction of rubbing, or in the case of the buffing wheel the plane of the wheel, in this treatment will always be kept parallel to the direction of the orientation desired in the finished polarizer. It is this rubbing, in the present example, which produces the field for orienting the pleochroic material which is subsequently applied.

To this rubbed surface I now apply a film of polarizable material which may consist, for example, of 20 parts by weight methylene blue (zinc free) dye in 100 parts methyl alcohol.

The film may be applied by dipping the bulb into the solution and removing it at a uniform speed of two inches per minute into an atmosphere saturated with methyl alcohol. When the bulb is completely removed it is shifted quickly into a current of dry air of relative humidity below 30% which flows uniformly across its surface. The air temperature may be between 50° F. and 80° F. and the air speed is regulated so that each point on the film dries in about 3 seconds after it comes into the dry air stream. When the coating has dried, the bulb is dipped into a solution containing 2% concentrated sulfuric acid and saturated with potassium bichromate. The coating is then washed gently with water and dried in air. For further protection of the film it can be dipped in a 5% solution of methyl methacrylate resin in toluol and again dried. These solutions for after-treatment of the film are designed to avoid re-dissolving the Methylene Blue and do not destroy its orientation.

This same method could, of course, be used with any glass surface as well as for lamp bulbs.

As an example of deposition from a fused condition I may substitute, in the above example, a bath of azoxyphenetol fused and maintained at a temperature of about 134–170° C. in place of the methanol solution as described. In this case instead of an atmosphere saturated with solvent, I use an atmosphere kept at a temperature above the upper melting point of the azoxy-phenetol. When coating is complete, the bulb temperature is reduced so that the cooling of the film progresses from the interior outward or uniformly throughout and solidification takes place uniformly throughout the thickness of the film or progressively from the inside out, but sufficiently fast that crystallization does not occur.

Among the numerous other articles which can be treated according to my invention may be mentioned polarizing filters for optical work of various kinds including photography, binoculars, goggles, windshields, mirrors, etc. Where the optical element is made of two glass parts fitted together, as in the case of lenses corrected for chromatic aberration, so-called "shatter-proof glass," etc., the polarizing film may be applied to the surface of the glass which is to be covered by the other piece so that this film is sandwiched between the two pieces of glass and is protected thereby. In the case of accurate lenses the film will ordinarily be applied relatively thin and without other materials, such as resin or other lacquer ingredients or coatings. In the case of shatter-proof glass the polarizing material may be incorporated in a lacquer solution or in or upon a resin or cellulosic film which may form or become a part of the flexible cementing layer between the two sheets of glass, and it is a very important advantage of my invention that it is possible thus to include the polarizing material in such standard glass constructions.

This application is a continuation in part of my prior copending applications Serial Nos. 217,249 and 263,779, filed respectively on July 2, 1938, and March 23, 1939.

What I claim is:

1. A method for producing a light polarizing film which comprises forming a true solution of a dichroic substance capable of existing in the nematic phase to bring about a molecular dispersion of the dichroic substance in the solvent, applying said solution to an impervious supporting surface, evaporating a portion of the solvent to bring the dichroic substance into the nematic phase, subjecting said solution while applied to said impervious surface and while in nematic phase to an orienting field to control the direction of orientation of the molecules of the dichroic substance, and evaporating the remaining solvent at a rate fast enough to prevent substantial departure of the molecules from the thus controlled orientation and slow enough to prevent ebullition or precipitation at the outer surface of the solution.

2. A method for producing a light polarizing film which comprises forming a true solution of a dichroic substance capable of existing in the nematic phase to bring about a molecular dispersion of the dichroic substance in the solvent, applying said solution to an impervious anisotropic supporting surface, evaporating a portion of the solvent to bring the dichroic substance into the nematic phase, the direction of orientation of the molecules being controlled by the orientation of said anisotropic surface, and evaporating the remaining solvent at a rate fast enough to prevent substantial departure of the molecules from the thus controlled orientation and slow enough to prevent ebullition or precipitation at the outer surface of the solution.

3. A method for producing a light polarizing film which comprises forming a true solution of a dichroic dye in methyl alcohol to bring about a molecular dispersion of the dichroic dye in the methyl alcohol, applying said solution to an impervious supporting surface, evaporating a portion of the methyl alcohol to bring the dichroic dye into the nematic phase, subjecting said solution while applied to said impervious surface and while in nematic phase to an orienting field to control the direction of orientation of the molecules of the dichroic dye, and evaporating the remaining methyl alcohol at a rate fast enough to prevent substantial departure of the dye molecules from the thus controlled orientation and slow enough to prevent ebullition or precipitation at the outer surface of the solution.

4. A method for producing a light polarizing film which comprises forming a true solution of methylene blue in methyl alcohol to bring about a molecular dispersion of the methylene blue in the methyl alcohol, applying said solution to an impervious supporting surface, evaporating a portion of the methyl alcohol to bring the methylene blue into the nematic phase, subjecting said solution while applied to said impervious surface and while in nematic phase to an orienting field to control the direction of orientation of the molecules of the methylene blue, and evaporating the remaining methyl alcohol at a rate fast enough to prevent substantial departure of the molecules of methylene blue from the thus controlled orientation and slow enough to prevent ebullition or precipitation at the outer surface of the solution.

5. A method for producing a light polarizing film which comprises forming a true solution of a dichroic substance capable of existing in the nematic phase to bring about a molecular dispersion of the dichroic substance in the solvent, immersing in said solution a support having an oriented impervious surface, withdrawing said support from said solution with a coating of the latter on the oriented impervious surface of the support into an atmosphere sufficiently saturated with respect to the solvent of said true solution to prevent solidification of the solution by loss of the solvent into said atmosphere while drainage occurs, thereafter evaporating a portion of the solvent to bring the dichroic substance into the nematic phase, and then evaporating the remaining solvent at a rate fast enough to prevent substantial departure of the molecules from the thus controlled orientation and slow enough to prevent ebullition or precipitation at the outer surface of the solution.

6. An optical element comprised of a transparent support having on a surface thereof a non-crystalline molecular coating of individually oriented molecules of a dichroic substance.

7. An optical element comprised of a transparent support having on a surface thereof a non-crystalline molecular coating of individually oriented molecules of methylene blue.

8. An optical element comprised of a transparent support and a coating of a solid transparent dichroic substance on a surface of said support, the molecules of said dichroic substance being substantially all oriented along one dimension each molecule in approximate parallelism to adjacent molecules but in random space arrangement as to direction from one to another.

9. An optical element comprised of a transparent support having an anisotropic surface oriented along approximately parallel lines and a coating of a solid transparent dichroic substance on the anisotropic surface of the support, the molecules of the dichroic substance being substantially all oriented along the parallel lines of orientation of the anisotropic surface but being in random arrangement as to direction from one to another, the lowermost molecules of said film adhering directly to said anisotropic surface.

10. An optical element comprised of a support and a coating of a solid transparent dichroic substance on a surface of support, the molecules of said dichroic substance being substantially all oriented along one dimension each molecule in approximate parallelism to adjacent molecules but in random space arrangement as to direction from one to another.

JOHN F. DREYER.